MEANS FOR PRODUCING DISPERSION IN ELECTRICAL OSCILLATIONS

Filed March 4, 1954

INVENTOR
William Halliday
BY
Moore & Hall
ATTORNEYS

United States Patent Office 2,843,676

Patented July 15, 1958

2,843,676

MEANS FOR PRODUCING DISPERSION IN ELECTRICAL OSCILLATIONS

William Halliday, Barkingside, England, assignor to Kelvin & Hughes Limited, Glasgow, Scotland Application March 4, 1954, Serial No. 414,189

Claims priority, application Great Britain March 6, 1953

8 Claims. (Cl. 179—100.2)

Figures 1, 2, 3, 4, 5:
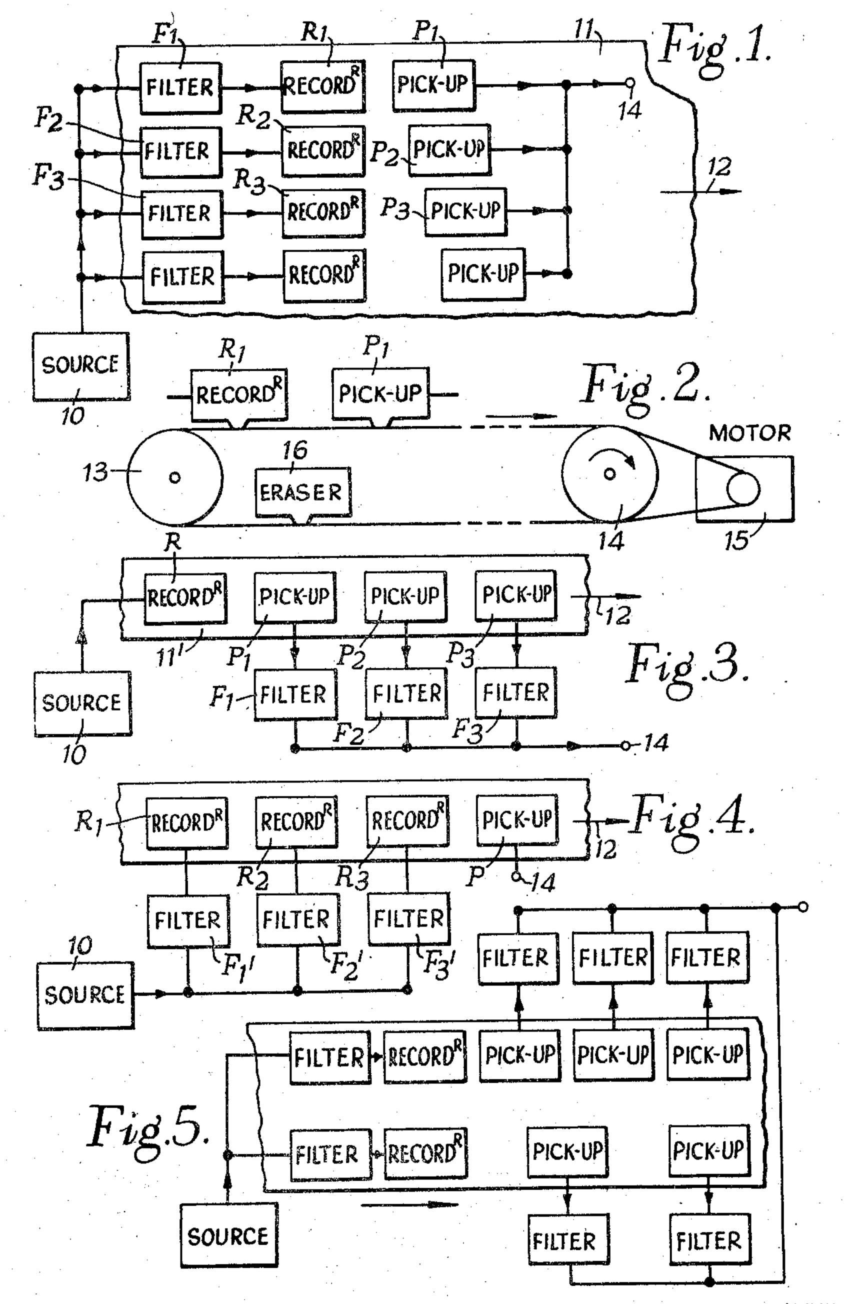

The present invention relates to the production of dispersion in electric oscillations: the property of dispersion is one in which the phase velocity is not constant but varies as some function of frequency.

Provided that the required rate of change of phase velocity with frequency is not too great, passive electrical networks can be constructed to provide amounts of dispersion suitable for many purposes, but if the bandwidth of the oscillations is large and if the change of velocity is required to be great the electrical network becomes inconveniently complicated and expensive since a large number of circuit elements is needed. Moreover attenuation may be undesirably high and may not be constant over the required frequency range. One example in which a dispersive medium is required and in which such medium cannot conveniently be made in the form of an electrical network is in producing frequency bunching, for instance as described in British patent specification No. 604,429. In that specification dispersion is produced by the use of a long metal strip along which mechanical vibrations are propagated, the strip being coiled into a helix in order to render it more compact. Even so the device is more bulky than is desirable for some purposes and it is the object of the present invention to provide, for producing dispersion, alternative means which can be made less bulky than the known device referred to.

According to the present invention in one form, means for producing dispersion in electrical oscillations comprise at least one magnetic recording head and a plurality of magnetic reproducing heads, the heads being adapted to co-operate with a magnetic record surface movable relatively thereto, connections to permit the application of said electrical oscillations to the one or more recording heads to produce on said surface magnetic variations corresponding to said oscillations, connections to enable output electrical oscillations which are generated in the reproducing heads by, and correspond to, the magnetic variations to be taken from the reproducing heads, and means for limiting the output electrical oscillations from different reproducing heads to different bands of frequency, the relative disposition of the heads being such that the time delays between the recording and reproduction of different frequency bands are different from one another.

The recording and reproducing heads may be arranged in pairs, each pair co-operating with a separate track on the record surface and means for limiting the output oscillations to different frequency bands may be associated with either the recording heads or the reproducing heads or with both. A plurality of reproducing heads may, however, be arranged to reproduce from a single track on the record surface and means for limiting the output oscillations to different frequency bands are then associated with the individual reproducing heads of the plurality.

In an alternative form of the invention there are provided a plurality of recording heads and at least one reproducing head. When a plurality of recording heads are arranged to record on a single track the limitation of oscillations to different frequency bands is carried out upon the input oscillations, so that the oscillations applied to different recording heads are of different frequency bands. One or more reproducing heads may reproduce from such a track.

The invention will be described by way of example with reference to the accompanying drawing in which:

Fig. 1 is a diagrammatic plan view of a part of one embodiment of the invention, Fig. 2 is a diagrammatic view in elevation of a part of the embodiment of Fig. 1, and Figs. 3 to 5 are diagrammatic views in plan of other embodiments of the invention.

Referring to Figs. 1 and 2, oscillations from a source 10 are applied through narrow band-pass filters $F_1$, $F_2$, $F_3$ etc. to recording heads $R_1$, $R_2$, $R_3$ etc. respectively. The oscillations may be fed in series or parallel, but the parallel arrangement is illustrated. Oscillations within bands of frequencies selected by the filters are recorded along parallel tracks on a broad endless tape 11 of magnetic material, such for example as paper, or other suitable base, coated with iron oxide. If desired, of course, a number of narrow tapes can be used instead of one broad tape. The tape 11 is moved over rollers 13, 14 in the direction of the arrow 12 by means of a motor 15. Reproducing or pick-up heads $P_1$, $P_2$, $P_3$ etc. are arranged to reproduce from the tracks, the distances between the recording and reproducing heads of the different tracks being made suitably different from one another. An output is taken from all the reproducing heads connected in parallel at 14. A series connection can be used if desired. An erasing head 16 (or a plurality of such heads) is arranged to erase the record before the magnetic material reaches the heads $R_1$, $R_2$ etc. A separate eraser can, however, be dispensed with if a suitable H. F. bias is applied in known manner to the recording heads $R_1$, $R_2$ etc.

If, for example, it is desired that in the output oscillations the apparent phase velocity of higher frequencies should be progressively greater than that of lower frequencies, the recording and reproducing heads $R_1$ and $P_1$ will be arranged to operate over the highest frequency band since they are arranged at the minimum spacing. The recording and reproducing heads of the track recording the lowest frequency band will be arranged at the maximum spacing, and the spacings on the other tracks recording progressively decreasing frequencies will vary progressively from the minimum to the maximum.

Provided that the number of tracks employed is sufficiently large, so that the frequency spectrum is sufficiently sub-divided, and provided that the bands are substantially contiguous, the effect produced will be approximately the same as that produced by the dispersive medium of British patent specification No. 604,429.

The relation between phase velocity and frequency can be made variable by arranging that the spacings of recording and reproducing heads can be varied.

It will be evident that, if desired, the filters may be arranged in the outputs of the reproducing heads instead of in the inputs of the recording heads.

In practice the provision of a large number of narrow band filters may be inconvenient and other means for ensuring that different frequencies are recorded along or reproduced from different tracks may be used. For instance the windings of the individual recording or reproducing heads may be shunted by suitable different capacitances and the combinations so produced may be connected in series to the input or output, as the case may be, each winding thus selecting a different frequency. The inverse arrangement may also be used. Thus each winding may be connected in series with a suitable capacitance and the combinations so produced may be connected in parallel. Alternatively the windings of the recording or reproducing heads may be arranged to form parts of a more complex network designed to ensure the required subdivision of the frequency band.

Instead of tapes there may be used a disc of magnetic material such as is employed in a known form of dictating machine. The tracks are arranged to be in the form of concentric circles, and not a spiral as in the dictating machine, by fixing the recording and reproducing heads. In this case it is the angular spacing of the heads that determines the delay. The heads dealing with the high frequencies are conveniently disposed near the outside of the disc and those dealing with low frequencies near the centre because the linear velocity of the disc is greater on the outside and is therefore more favourable to the recording of higher frequencies.

Instead of using equal numbers of recording and reproducing heads, the numbers may be unequal. Thus one or a small number of recording heads may be used in co-operation with a large number of reproducing heads, and vice versa. A limiting case is illustrating in Fig. 3 in which a single recording head R records on a single track on a narrow tape 11′ and the desired number of reproducing heads $P_1$, $P_2$ etc. are arranged along the track. The frequency selection is then effected on the output side by means of filters $F_1$, $F_2$ etc.

Similarly a large number of recording heads may record different frequency bands along the same track and a single reproducing head may be used. This is illustrated in Fig. 4 where, however, for simplicity, only three recording heads $R_1$, $R_2$ and $R_3$ are shown. Filters $F_1'$, $F_2'$ and $F_3'$ are provided on the input side and a single reproducing head P is used. In this case a separate erasing head, such as 16 in Fig. 2, is required.

In a modification a small number of recording heads is used, each recording the whole or a part of the spectrum and a plurality of reproducing heads is arranged to pick up from each recorded track, the required sub-division of frequency bands being effected on the output side. Thus in Fig. 5 two recording heads $R_1'$ and $R_1''$ are provided each co-operating with a number of reproducing heads of which only some, such as $P_1'$, $P_2'$ and $P_1''$, $P_2''$ are shown. The recording heads may be associated with filters $F_1''$ and $F_2''$ respectively which, for example, divide the frequency band into a higher and a lower half. The filters associated with the reproducing heads effect the sub-division of the higher and lower frequency bands. Obviously a comparable arrangement may be with a small number of reproducing heads and a large number of recording heads.

I claim:

1. Apparatus for varying the phase velocity of input electrical oscillations as a function of the frequency of such oscillations, comprising a magnetic recording body, two electro-magnetic transducer means, means for producing relative motion between said body and said transducer means, one of said transducer means recording electric oscillations on, and the other picking up electric oscillations from, at least one track on said body, the first of said transducer means including at least one transducer and the second said transducer means comprising a plurality of transducers at different distances from the transducer of said first transducer means cooperating therewith, frequency-selective means coupled to each transducer of said plurality, and each passing a different band of frequency, means for applying said input electrical oscillations to said recording transducer means, and means connecting said reproducing transducer means to a common output, said first transducer means comprise a plurality of recording transducers each recording on separate tracks on said body and said second transducer means comprises a reproducing transducer picking up oscillations from each of said separate tracks, said reproducing transducers being at different distances from said recording reproducers along their respective tracks.

2. Apparatus for varying the phase velocity of input electrical oscillations as a function of the frequency of such oscillations, comprising a magnetic recording body, two electro-magnetic transducer means, means for producing relative motion between said body and said transducer means, one of said transducer means recording electric oscillations on, and the other picking up electric oscillaions from, at least one track on said body, the first of said transducer means including at least one transducer and the second said transducer means comprising a plurality of transducers at different distances from the transducer of said first transducer means cooperating therewith, frequency-selective means coupled to each transducer of said plurality, and each passing a different band of frequency, means for applying said input electrical oscillations to said recording transducer means, and means connecting said reproducing transducer means to a common output, said first transducer means consists of a plurality of recording transducers recording upon a single track on said body and said second transducer means consists of a single reproducing transducer picking up oscillations from said track and at different distances along said track from said recording transducers.

3. Apparatus for varying the phase velocity of input electrical oscillations as a function of the frequency of such oscillations thereby to produce dispersion of the said input electrical oscillations, comprising a movable record storage medium having a plurality of recording channels therein, each of said recording channels including a recording element responsive to said input oscillations for recording signals in said channel, each of said recording channels further including pick-up means spaced from said recording element and responsive to signals recorded in said channel for producing an output from said channel after a time delay, frequency determining means coupled to each of said channels for restricting and determining the frequency of output signal from each channel whereby said channels are respectively characterized by the presence of a unique band of frequencies at the output of each of said channels, the spacing between the recording element and pick-up means associated with each of said channels being different for different ones of said channels whereby the different frequency outputs of said channels occur respectively at different time intervals subsequent to the recording of signals in said channels, and means coupling the outputs of said plurality of channels to a common output point.

4. The apparatus of claim 3 wherein said plurality of recording channels comprises a plurality of distinct tracks on said record medium.

5. The apparatus of claim 3 wherein said storage medium comprises a magnetic tape, each of said recording elements and pick-up means comprising a magnetic transducer.

6. The apparatus of claim 3 wherein said plurality of recording channels comprises a magnetic tape having a plurality of distinct record tracks thereon, said recording elements and pick-up elements comprising a separate magnetic recording head and a separate magnetic reproducing head adjacent each of said tracks.

7. The apparatus of claim 3 wherein the comparative spacing between the recording element and pick-up means respectively associated with said plurality of channels increases as the recorded frequency increases.

8. The apparatus of claim 3 wherein the comparative spacing between the recording element and pick-up means respectively associated with said plurality of channels increases as the recorded frequency decreases.

References Cited in the file of this patent

UNITED STATES PATENTS

| | | |
|---|---|---|
| 2,105,318 | Goldsmith | Jan. 11, 1938 |
| 2,213,246 | Heller | Sept. 3, 1940 |
| 2,327,956 | Begun | Aug. 24, 1943 |
| 2,351,009 | Camras | June 13, 1944 |